(12) United States Patent
Chang

(10) Patent No.: US 7,454,130 B2
(45) Date of Patent: Nov. 18, 2008

(54) ANTI-VIBRATION APPARATUS FOR IMAGE PICKUP SYSTEM AND IMAGE PICKUP SYSTEM HAVING THE SAME

(75) Inventor: Wei-Chung Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 277 days.

(21) Appl. No.: 11/309,855

(22) Filed: Oct. 13, 2006

(65) Prior Publication Data

US 2007/0188618 A1 Aug. 16, 2007

(30) Foreign Application Priority Data

Dec. 20, 2005 (CN) .................... 2005 1 0121032

(51) Int. Cl.
*G03B 17/00* (2006.01)
*H04N 5/228* (2006.01)
*G05B 11/01* (2006.01)
*B64C 17/02* (2006.01)

(52) U.S. Cl. .................... 396/55; 348/208.2; 348/208.4; 318/560; 318/648; 359/554

(58) Field of Classification Search ............... 396/52, 396/55; 348/208.2, 208.4; 318/560, 568.2, 318/568.24, 602, 648; 359/554–557
See application file for complete search history.

(56) References Cited

U.S. PATENT DOCUMENTS

| | | | | |
|---|---|---|---|---|
| 5,027,047 | A * | 6/1991 | Logan et al. | 318/648 |
| 6,078,751 | A * | 6/2000 | Yamazaki et al. | 396/55 |
| 6,263,162 | B1 * | 7/2001 | Yamazaki et al. | 396/55 |
| 6,278,842 | B1 * | 8/2001 | Yamazaki et al. | 396/55 |
| 6,414,715 | B1 | 7/2002 | Sato | 348/208 |
| 7,049,780 | B2 * | 5/2006 | Chang | 318/602 |

* cited by examiner

*Primary Examiner*—Melissa Jan Koval

(57) ABSTRACT

An exemplary anti-vibration apparatus used in an image pickup system includes a first light-reflecting unit, a driving mechanism configured for driving the light-reflecting unit to rotate, a servo circuit, at least one sensor configured for detecting an angular velocity of the anti-vibration apparatus and sending such signal to the servo circuit, the servo circuit is configured for generating a controlling signal received from the sensor and controlling the driving mechanism based on the controlling signal. The anti-vibration apparatus can eliminate the image vibration caused by the vibration of image pickup system.

15 Claims, 5 Drawing Sheets

ANTI-VIBRATION APPARATUS FOR IMAGE PICKUP SYSTEM AND IMAGE PICKUP SYSTEM HAVING THE SAME

DESCRIPTION

1. Technical Field

The present invention relates generally to an anti-vibration apparatus used in an image pickup system and an image pickup system having the same.

2. Discussion of Related Art

Portable image pickup systems such as digital cameras and digital video cameras are widely used in daily life, generally, these types of apparatus include a lens group and an image pickup system such as a charge-coupled device (CCD) or complementary metal oxide semiconductor (CMOS). The lens group projects an image of an object onto the image pickup system and the image is converted into data and is stored in a storage apparatus such as a flash memory card.

However, the image quality of these apparatuses is greatly reduced when they are subjected to vibration caused by tremors of the operator's hands or external forces. The vibration causes deflection of the optical axis of these apparatuses, thus during exposure different images are formed on the image pickup system and a blurry imaged is obtained. It is therefore desirable to provide an anti-vibration apparatus used in an image pickup system and an image pickup system having the anti-vibration apparatus.

SUMMARY

In one embodiment, an anti-vibration apparatus used in an image pickup system includes a first light-reflecting unit, a driving mechanism configured for driving the light-reflecting unit to rotate, a servo circuit, and at least one sensor configured for detecting an angular velocity of the anti-vibration apparatus and send such signal to the servo circuit. The servo circuit is configured for generating a controlling signal received from the sensor and controlling the driving mechanism based on the controlling signal.

In another embodiment, an image pickup system includes an image pickup device, a image-forming device configured for forming an image of an object on the image pickup device and an anti-vibration apparatus. The anti-vibration apparatus comprises a first light-reflecting unit, a driving mechanism configured for driving the light-reflecting unit to rotate, a servo circuit, at least one sensor configured for detecting an angular velocity of the anti-vibration apparatus and sending a corresponding signal to the servo circuit, the servo circuit is configured for generating a controlling signal received from the sensor and controlling the driving mechanism based on the controlling signal.

This and other features and advantages of the present invention as well as the preferred embodiments thereof in accordance with the invention will become apparent from the following detailed description and drawings.

BRIEF DESCRIPTION OF THE DRAWINGS

Many aspects of the present image pickup system can be better understood with reference to the following drawings. The components in the drawings are not necessarily drawn to scale, the emphasis instead being placed upon clearly illustrating the principles of the present image pickup system.

DETAILED DESCRIPTION OF THE PREFERRED EMBODIMENTS

Figure 1:
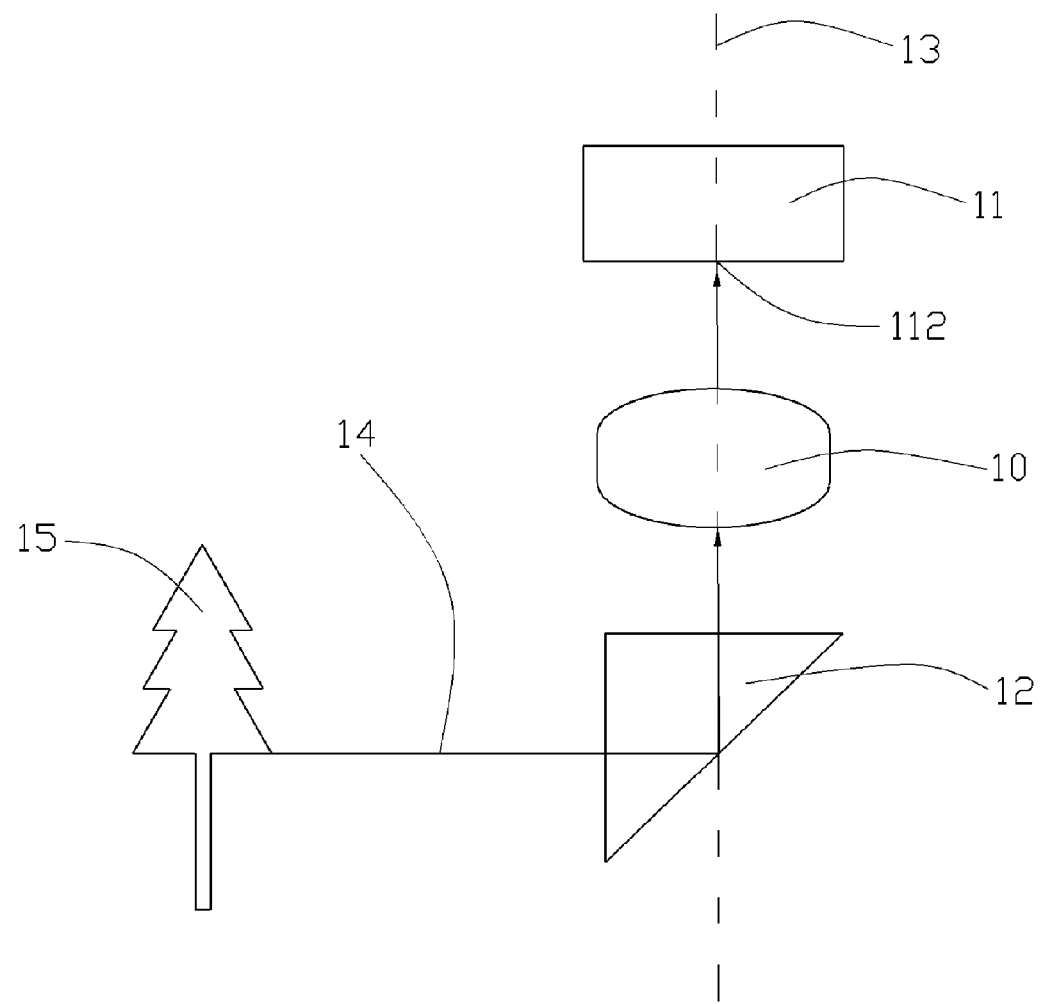
FIG. 1 is a schematic view of an image pickup system having an anti-vibration apparatus in accordance with a first embodiment.

Referring to FIG. 1, an image pickup system 100 in accordance with a first embodiment includes an image-forming device 10 such as a lens group, an image pickup device 11 such as a charge-coupled device (CCD) or complementary metal oxide semiconductor (CMOS), and an anti-vibration apparatus 12. The image pickup system has an optical axis 13. The image-forming device 10 is used to form an image of an object 15 on the image pickup device 11. A light beam 14 emitted from the object 15 is shown as an example, the light beam 14 is reflected to the image-forming device 10 by the anti-vibration apparatus 12 and finally focused on a central point 112 of a surface of the image pickup device 11.

Figure 2:
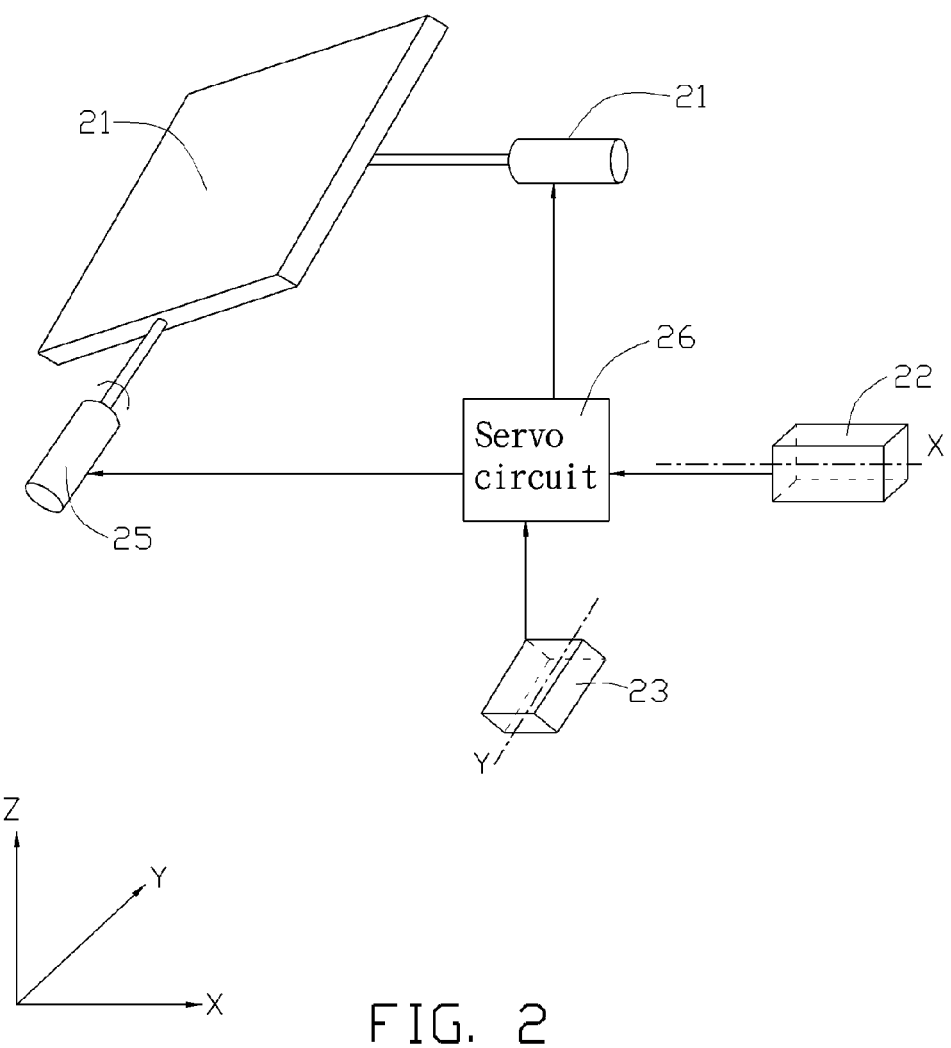
FIG. 2 is a schematic view of the anti-vibration apparatus of FIG. 1.

Referring to FIG. 2, in the preferred embodiment, the anti-vibration apparatus 12 includes a light-reflecting unit 21, an X-direction sensor 22, a Y-direction sensor 23, a first motor 24, a second motor 25 and servo circuit 26.

The light-reflecting unit 21 can be a mirror or a prism coated with a light-reflecting film. The light-reflecting unit 21 is configured for reflecting light beams emitted from an object to the image-forming device 10. The X-direction sensor 22 and the Y-direction sensor 23 can be a gyro, such as fiber-optic gyroscope (FOG) or a piezoelectric gyroscope. The X-direction sensor 22 is configured for detecting an angular velocity of the anti-vibration apparatus 12 in the lateral direction (referred to as the X direction in the following description) and sends signals to the servo circuit 26. The Y-direction sensor 23 is configured for detecting an angular velocity of the anti-vibration apparatus 12 in the vertical direction (referred to as the Z direction in the following description) and sends such signal to the servo circuit 26. The servo circuit 26 receives signals from the X-direction sensor 22 and the Y-direction sensor 23 and calculates the deflection angle of the anti-vibration apparatus 12 in both the X direction and the Y direction. The combination of the deflection angle of the anti-vibration apparatus 12 in the X direction and the deflection angle of the anti-vibration apparatus 12 in the Y direction are equivalent to the deflection angle of θ of the anti-vibration apparatus 12. If the anti-vibration apparatus 12 deflects an angle, the servo circuit 26 generates a signal and drives the first motor 24 and the second motor 25 to turn the light-reflecting unit 21 in the X direction and Z direction respectively based on the signal.

Figure 3:
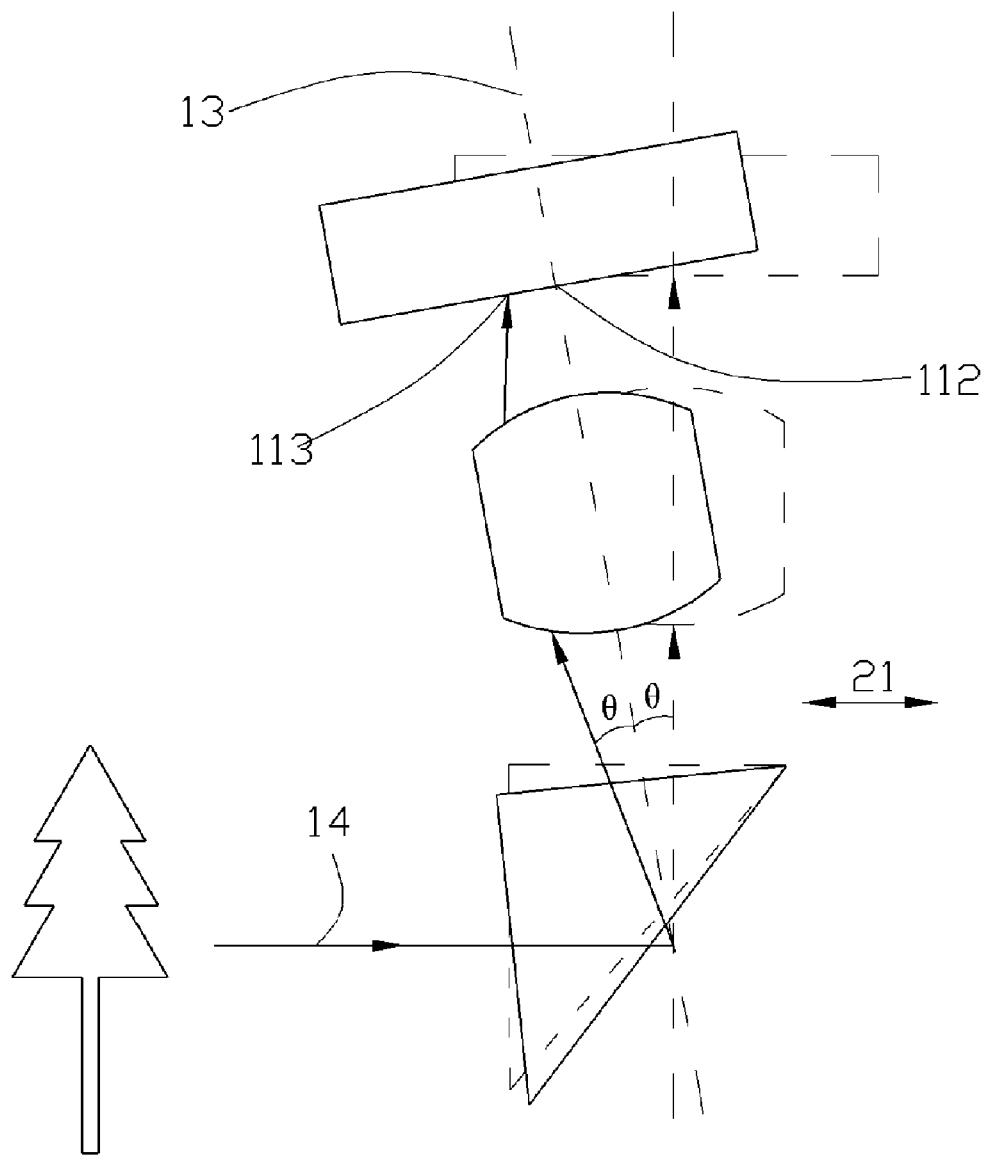
FIG. 3 is a schematic view showing the image pickup system of FIG. 1 deflected through an angle θ.
Figure 4:
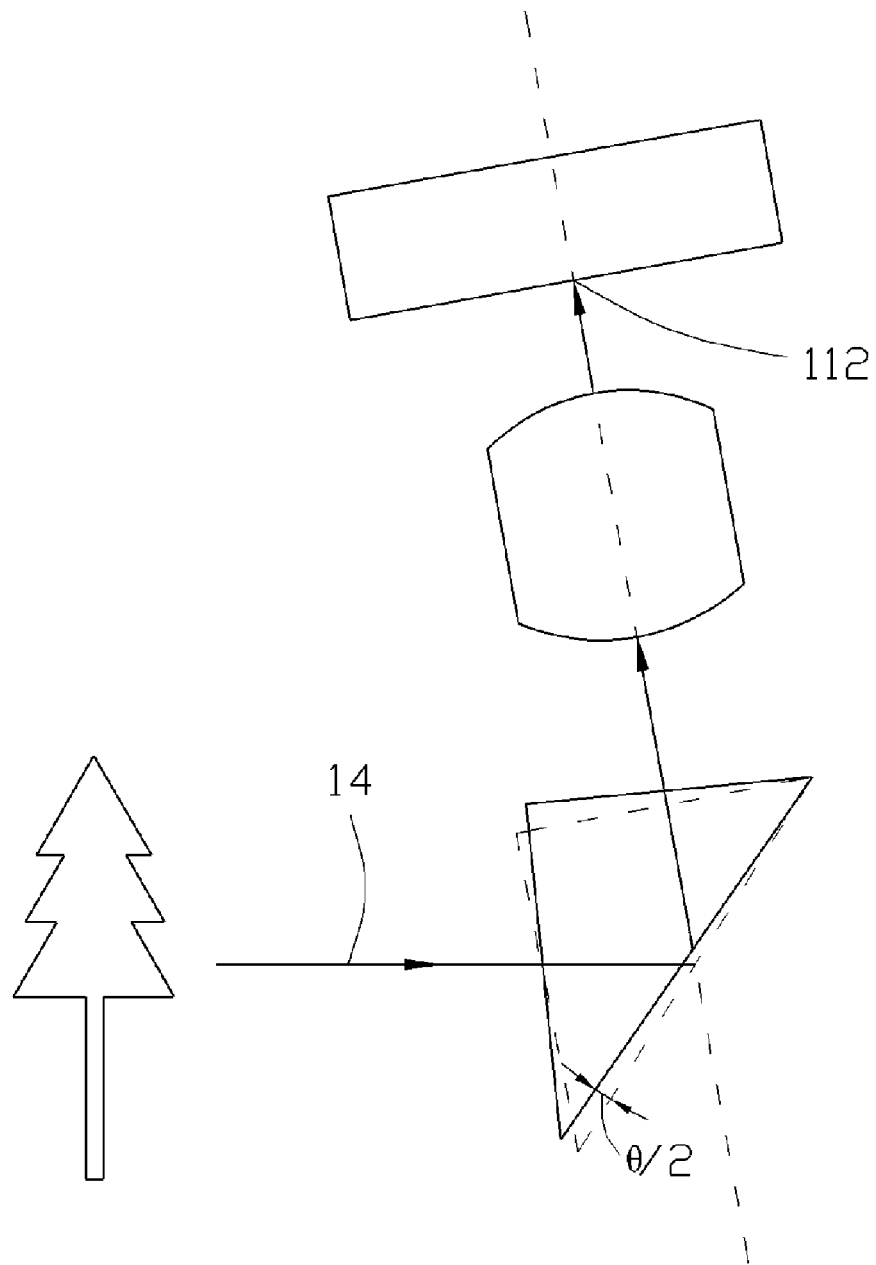
FIG. 4 is a schematic view showing the anti-vibration apparatus compensating for the deflection angle θ.

FIG. 3 and FIG. 4 are schematic views for illustrating the anti-vibration principle of the anti-vibration apparatus 12. Referring to FIG. 3, the image pickup system deflects through a deflection angle θ in the X direction. According to the reflection principle, the light beam 14 deflects an angle of 2θ after being reflected by the anti-vibration apparatus 12, thus the light beam 14 deflects through a deflection angle θ from the optical axis 13. If the light-reflecting unit doesn't rotate the light beam will focus on a point 113 that is away from the central point 112, but in the preferred embodiment, the X direction sensor 12 detects the deflection angle θ and the servo circuit 26 generates a signal and drives the motor based on the signal, the first motor 24 turns the light-reflecting unit 21 to rotate through an angle of θ/2 in the reverse direction. Referring to FIG. 4, the light beam 14 is also focused on the central point 112 after the image pickup system deflects an angle of θ, in other words, the image vibration is eliminated.

Figure 5:
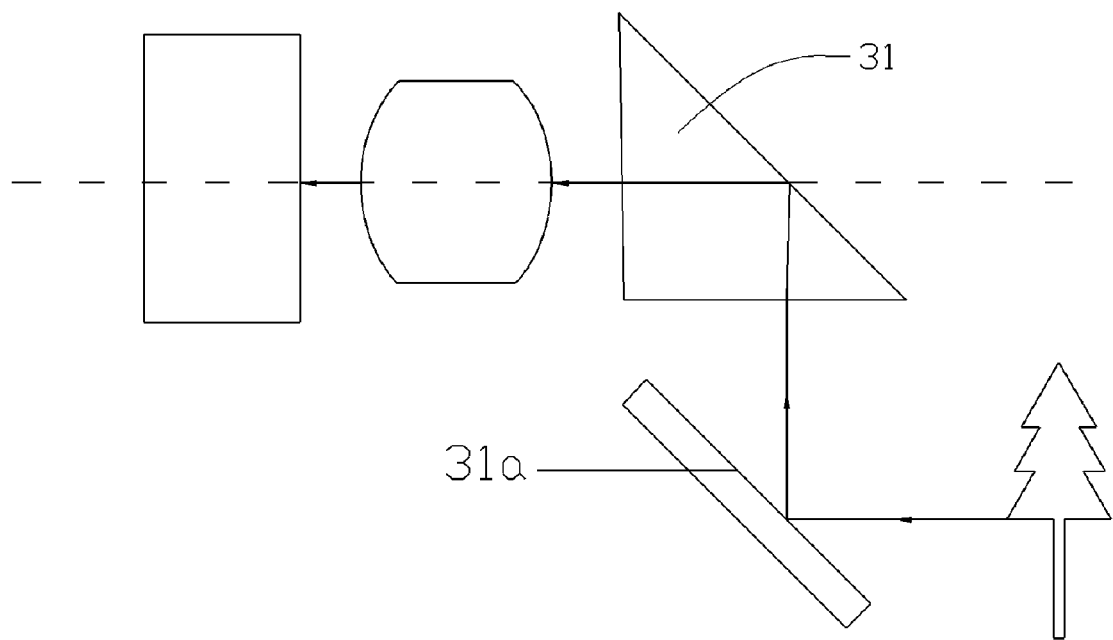
FIG. 5 is a schematic view of an image pickup system in accordance with a second embodiment.

Referring to FIG. 5, an image pickup system in accordance 200 with a second embodiment is similar to that of the first embodiment except that further includes a second light-reflecting unit 31a such as a mirror. The second light-reflecting unit 31a is configured for reflecting light beams from an object to the light-reflecting unit 31. Unlike the periscope-like design of the image pickup system in accordance with the first embodiment, in the image pickup system 200 the optical axis 32 is parallel with the light beams emitted from an object.

In the aforementioned embodiments, the anti-vibration apparatus includes two sensors configured for detecting the deflection in two different directions, but in some cases where, for example, the image pickup system only needs to deflect in one direction, the anti-vibration apparatus need only include one sensor. For example, the image pickup system can be secured on a tripod and can only rotate in the lateral direction.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An anti-vibration apparatus for an image pickup system the anti-vibration apparatus comprising: a light-reflecting unit, at least one sensor configured for detecting a rotating angle of θ of the image pickup system in a first rotating direction due to vibration thereof, thus obtaining a feedback signal associated therewith;
a servo circuit; and
a driving mechanism, the servo circuit being configured for receiving the feedback signal from the at least one sensor and controlling the driving mechanism to rotate the light-reflecting unit through a rotating angle of θ/2 in a second rotating direction opposite to the first rotating direction.

2. The anti-vibration apparatus as claimed in claim 1, wherein the at least one sensor comprises a first sensor configured for detecting a rotating angle of the image pickup system in a first direction and a second sensor configured for detecting a rotating angle of the image pickup system in a second direction perpendicular to the first direction.

3. The anti-vibration apparatus as claimed in claim 2, wherein the driving mechanism comprising a first motor configured for rotating the light-reflecting unit in a third direction opposite to the first direction and a second motor configured for rotating the light-reflecting unit in a fourth direction opposite to the second direction.

4. The anti-vibration apparatus as claimed in claim 1, wherein the sensor is a gyroscope.

5. The anti-vibration apparatus as claimed in claim 4, wherein the gyroscope is selected form the group consisting of fiber-optic gyroscope and piezoelectric gyroscope.

6. The anti-vibration apparatus as claimed in claim 1, further comprising a second light-reflecting unit configured for reflecting a light beam from an object to the first light-reflecting unit.

7. The anti-vibration apparatus as claimed in claim 1, wherein the light-reflecting unit can be selected from the group consisting of a mirror and a prism with a light-reflecting film formed thereon.

8. An image pickup system comprising:
an image pickup device configured for obtaining an image of an object; and
an anti-vibration apparatus comprising:
a first light-reflecting unit
at least one sensor configured for detecting a rotating angle of θ of the image pickup system in a first rotating direction due to vibration thereof, thereby obtaining a feedback signal associated therewith;
a servo circuit; and
a driving mechanism, the servo circuit being configured for receiving the feedback signal from the at least one sensor and controlling the driving mechanism to rotate the light-reflecting unit by a rotating angle of θ/2 in a second rotating direction opposite to the first rotating direction.

9. The image pickup system as claimed in claim 8, wherein the at least one sensor comprises a first sensor configured for detecting a rotating angle of the image pickup system in a first direction and a second sensor configured for detecting a rotating angle of the image pickup system in a second direction perpendicular to the first direction.

10. The image pickup system as claimed in claim 8, wherein the driving mechanism comprises a first motor configured for rotating the light-reflecting unit in a third direction opposite to the first direction and a second motor configured for rotating the light-reflecting unit in a fourth direction opposite to the second direction.

11. The image pickup system as claimed in claim 8, wherein the sensor is a gyroscope.

12. The image pickup system as claimed in claim 11, wherein the gyroscope is selected form the group consisting of fiber-optic gyroscope and piezoelectric gyroscope.

13. The image pickup system as claimed in claim 8, further comprising a second light-reflecting unit configured for reflecting a light beam from an object to the first light-reflecting unit.

14. The image pickup system as claimed in claim 8, wherein the light-reflecting unit can be selected from the group consisting of a mirror and a prism with a light-reflecting film formed thereon.

15. The image pickup system as claimed in claim 8, wherein the anti-vibration apparatus is disposed on the object side of the image-forming device.

* * * * *